May 4, 1965 L. J. DESHAIES 3,181,219
SNAP FASTENER ASSEMBLY
Filed Jan. 29, 1964 2 Sheets-Sheet 1
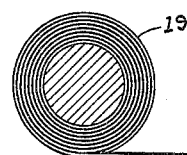
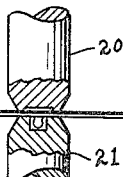
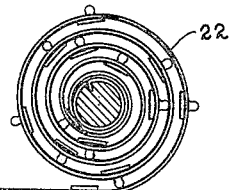
Fig.1.
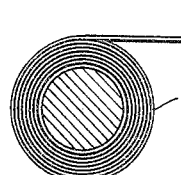
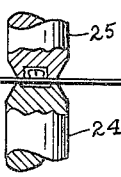
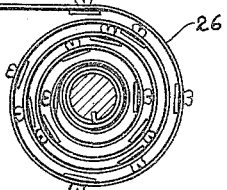
Fig.2.
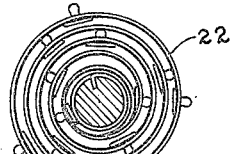
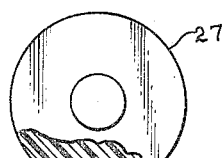
Fig.3.
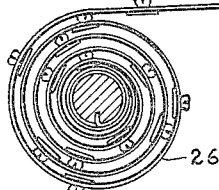
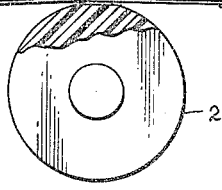
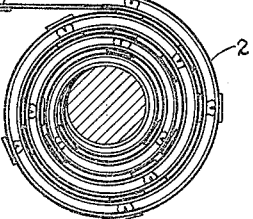
Fig.4.
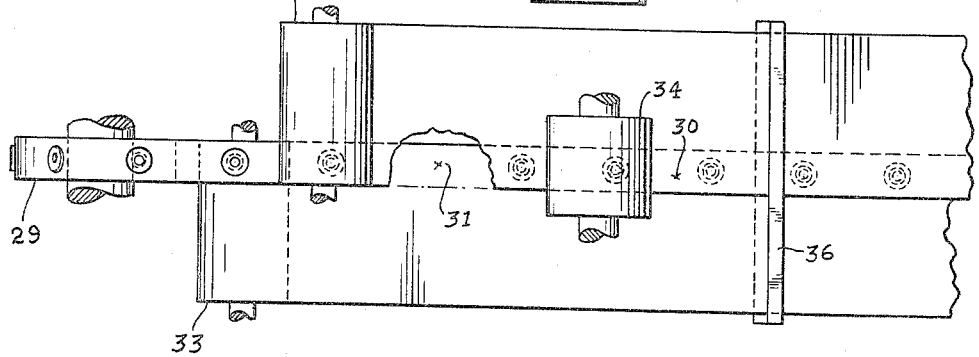

May 4, 1965 L. J. DESHAIES 3,181,219
SNAP FASTENER ASSEMBLY
Filed Jan. 29, 1964
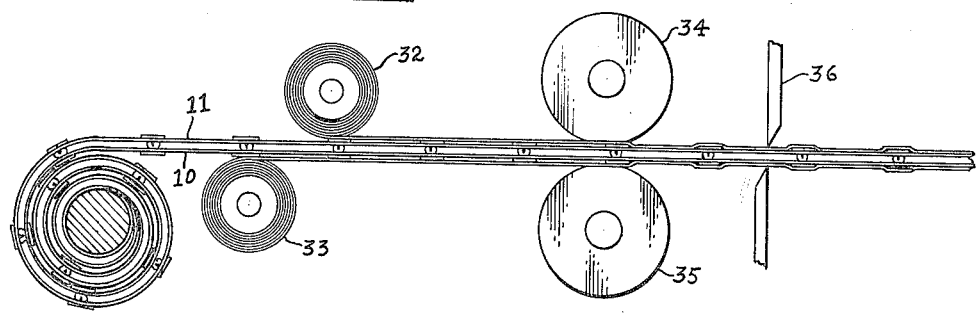
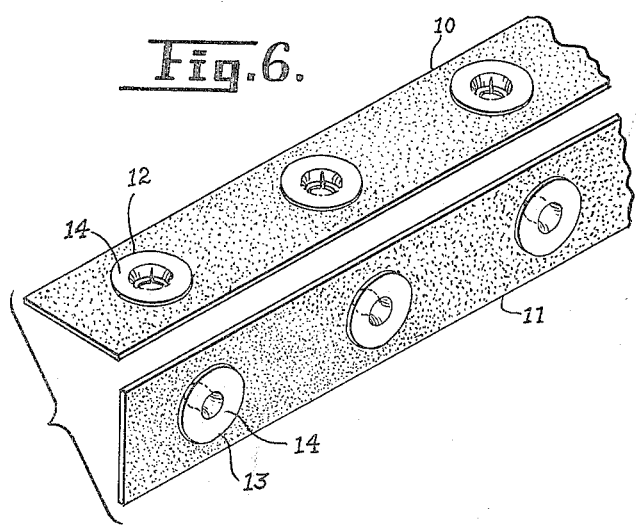
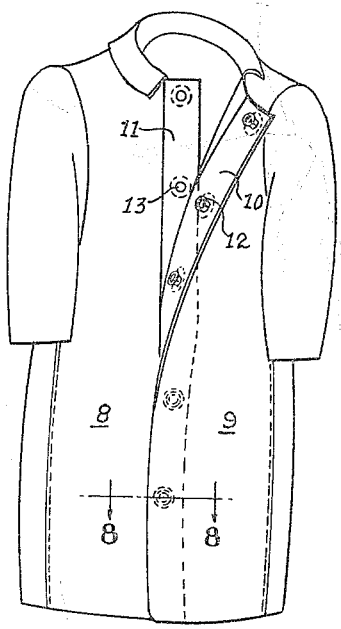
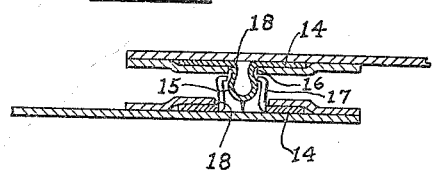

3,181,219
SNAP FASTENER ASSEMBLY
Leo J. Deshaies, Meriden, Conn., assignor to Scovill Manufacturing Company, New Haven, Conn., a corporation of Connecticut
Filed Jan. 29, 1964, Ser. No. 341,037
2 Claims. (Cl. 24—203)

This application is a continuation-in-part of my application Serial No. 148,104, filed October 27, 1961, now abandoned.

The invention relates to snap fastener assemblies and to an improved method of making the same.

The general object of the invention is to provide a snap fastener assembly which employs cheap fastener elements which can be supplied in strips and an economical method of assembling and attaching the same to a garment or other articles to be fastened. Such assemblies are particularly suitable for disposable garments which may be made of fragile material, such as treated paper.

Another object of the invention is to produce a snap fasttener assembly of the character described which will have a minimum overall thickness so as to be harmonious with a thin garment or similar article.

Another object of the invention is to produce a snap fastener assembly of the character described in which the fastener elements are concealed when the article is fastened and wherein no perforations are required in the material of the article itself.

A still further object is to provide an improved method of making a snap fastener assembly which will require no bending of prongs or other parts for the secure attachment of the fasteners in place. This is done preferably by providing a thin flat base of relatively large area on each of the socket and stud elements and securing the inner face of such base to a strip adhesively. With the socket elements so secured to one strip and the stud elements to another strip, my improved method further provides for interengaging the socket and stud elements to produce a double strip with two adhesive surfaces facing outwardly on opposite sides of the strip.

Other objects and advantages of the invention will hereinafter more fully appear.

In the accompanying drawings, I have shown for purposes of illustration, one embodiment which the invention may assume in practice. In the drawings:

FIG. 1 illustrates the step in my improved method consisting of attaching the stud elements to a strip which has been previously coated on one side with adhesive;

FIG. 2 is a similar view indicating how the socket elements are attached to a second strip;

FIG. 3 is a diagrammatic view showing how the two strips can be secured together;

FIG. 4 is a plan view showing a final stage of assembling the double strip with overlapping edges of sheet material;

FIG. 5 is a side view of the same;

FIG. 6 is a detailed perspective of the socket and stud strips with the adhesively-coated surfaces indicated by stippling;

FIG. 7 is a front view of a coat employing my invention;

FIG. 8 is a detailed cross-section through the assembly on line 8—8 of FIG. 7 on a large scale.

My invention is shown in FIG. 7 as applied to the overlapping edges of the two sides 8 and 9 of an article to be fastened. One such article to which the invention is especially adapted is a chemically impregnated paper coat or cover-all garment such as shown in FIG. 7 and which may be used for protection against radioactive fallout.

The fastener assembly generally consists of a pair of flat strips 10 and 11 which may be of comparatively strong paper coated or treated on one side with adhesive as indicated by heavy lines in FIGS. 1 and 2 and by stippling in FIG. 6, and preferably, this is of the pressure-sensitive type. The strip 10 carries a row of snap fastener socket elements 12 while the strip 11 carries a row of complementary stud snap fastener elements 13. Each of these elements consists of a single piece of thin sheet material, preferably metal, and has a comparatively large flat circular base 14 from which the tubular-shaped fastening means projects in a perpendicular direction. In the case of the stud element, the fastening means may be a hollow stud 15 shaped with a neck of reduced diameter 16; in the case of the socket element, the fastening means consists of a plurality of spring fingers 17 in circular arrangement. These fasteners are generally of the type commonly used for paper envelopes and a more detailed description is believed to be unnecessary.

The flat bases 14 of the fastener elements are secured by adhesive to the strips 10 and 11 throughout their inner faces from which the fastening means project, and in the case of the strips provided with pressure-sensitive material, it is merely necessary to feed the fastener elements into the desired position and force their tubular fastening means through the strips, the apertures 18 being self-pierced by the stud or socket portion, as the case may be, and then press the bases 14 against the surface of the strip.

These initial steps in the process are shown in FIGS. 1 and 2.

FIG. 1 shows the strip 11 feeding from a roll 19. The stud elements 13 may be fed by any suitable means (not shown) in proper position over the strip 11 and secured by a plunger 20 and supporting die or anvil 21. Thereafter, the stud strip may be wound up in the form of a roll 22.

Similarly, in FIG. 2, the strip 10 which has previously been coated with adhesive on one side, is fed from a roll 23 and the socket elements 12 are attached to the strip in the same manner as the stud elements 13 by a punch 24 and a supporting die or anvil 25, and from the attaching station, the socket strip is wound on a roll 26.

FIG. 3 indicates how the two strips 10 and 11 can be assembled together to form a double strip with the adhesive surfaces surrounding the flat bases of the element facing outwardly on opposite sides of such double strip. The stud and socket strips are fed from the rolls 22 and 26 respectively, between a pair of pressure rolls 27 and 28 to interengage the socket and stud elements, whereupon the double strip is wound in the form of a roll 29. If the adhesive material is of such nature that it might tend to stick to the rolls 27 and 28, they could be coated with Teflon to prevent sticking.

When the fastener strips are assembled, it will be noted that the adhesive coating is on the outer faces of the strips and that such coating extends over the width of the strip which is substantially wider than the diameter of the fastener element bases 14. The fasteners are thus adequately supported against tilting and against shifting laterally.

The final assembly can be made by bringing the front and back overlapping edge portions 30 and 31 respectively, of the sheet material into proper position with the double strip feeding from roll 29.

In FIGS. 4 and 5, I have shown such sheet material as feeding from rolls 32 and 33. Thus a continuous assembly can be formed by pressing the overlapping edge portions to the opposite faces of the double strip as by pressure rolls 34 and 35. From such continuous assembly, the desired lengths may be cut by shears diagrammatically indicated at 36.

In making the assembly to a garment such as indicated in FIG. 7, a predetermined length of double strip can be cut, simply placed between the overlapping front edges of the garment and the assembly made by applying pressure by hand or any other suitable means.

As a result of my invention, it will be observed that an exceedingly economical and secure fastener assembly has been provided which can be easily applied to thin garments or other articles.

Also, it will be noted that the resulting assembly has the minimum bulk and does not interfere with the appearance or protective property of the garment since no holes are required to be made in the overlapping edges.

What I claim is:

1. An elongated snap fastener assembly comprising an article of sheet material having an opening with front and back overlapping edge portions, a pair of elongated flexible strips in opposed relation to each other, one of which is adhesively secured to the front surface of said back overlapping edge portion and the other of which is secured to the back surface of said front overlapping edge portion, snap fastener elements arranged in pairs along the length of said assembly, each element having a thin flat back between one of said flexible strips and the sheet material to which it is adhesively secured, the elements of each pair having co-operating stud and socket snap fastening means of generally tubular shape projecting toward each other from the thin flat bases of the elements through apertures in their respective flexible strips, said edge portions of the article being both imperforate in the region of said fastener elements.

2. An elongated snap fastener assembly as defined in claim 1 wherein the inner flat surface of the base of each fastener element surrounding its tubular fastening means is adhesively secured to the adjacent flexible strip and wherein each of said strips is substantially wider than the transverse dimension of said bases of the fastener elements.

References Cited by the Examiner

UNITED STATES PATENTS

| | | | |
|---|---|---|---|
| 1,875,950 | 9/32 | Stryke | 24—208 |
| 2,095,209 | 10/37 | Brownsdon | 156—66 |
| 2,105,333 | 1/38 | Roseman | 24—203 |
| 2,208,434 | 7/40 | Seidel | 24—203 |
| 2,524,842 | 10/50 | Slamon | 24—90 |
| 2,555,983 | 6/51 | Matthiesen | 24—67.1 |
| 2,567,298 | 9/51 | Morner | 24—203 |
| 2,674,559 | 4/54 | Zobel | 156—66 |
| 2,701,222 | 2/55 | Hetzel | 156—66 |

FOREIGN PATENTS

| | | |
|---|---|---|
| 7,761 | 5/15 | Great Britain. |
| 24,664 | 10/12 | Great Britain. |
| 27,104 | 11/09 | Great Britain. |

DONLEY J. STOCKING, *Primary Examiner.*